United States Patent Office 2,746,971
Patented May 22, 1956

2,746,971

DINITROBENZOXAZOLES

Robert O. Dorton, Midland, Mich., assignor to The Dow Chemical Company, Midland, Mich., a corporation of Delaware No Drawing. Application November 2, 1954,
Serial No. 466,435

3 Claims. (Cl. 260—307)

The present invention is directed to the dinitrobenzoxazoles of the following formula

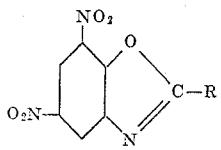

wherein R represents ethyl or propyl. These novel compounds are crystalline solids which are somewhat soluble in many organic solvents such as xylene and the aliphatic ketones and alcohols and are of very low solubility in water. The compounds are valuable as intermediates for the preparation of more complex organic derivatives and as active toxic constituents of compositions for the control of many common bacterial and fungal organisms. The compounds also have been found valuable as active toxic constituents of compositions for the control of gastro-intestinal parasites in domestic animals.

The new compounds may be prepared by reacting picramic acid with propionic anhydride or butyric anhydride. The reaction is carried out in the presence of a small amount of a dehydration catalyst such as phosphoric acid, sulfuric acid, benzene sulfonic acid, toluene sulfonic acid or a cation exchange resin in the acid form. Good results are obtained when employing at least two molecular proportions of the anhydride reagent with each molecular proportion of the picramic acid; optimum yields being obtained when from three to six molecular proportions of the anhydride reagent are employed with each molecular proportion of picramic acid. Sometimes the reaction conveniently may be carried out in a solvent such as xylene, toluene or the acid from which the anhydride reagent may be prepared.

In carrying out the reaction the picramic acid, anhydride, catalyst and solvent, if employed, are mixed together and the resulting mixture heated for a period of time at a temperature of from 75° to 170° C. to complete the reaction. The reaction takes places smoothly at the temperature range of from 75° to 170° C. and at a rate which varies directly with the temperature employed. The reaction is generally carried out over a period of from about one-half to six hours, or longer, the longer periods of reaction being employed at the lower temperatures. In carrying out the reaction, it is oftentimes convenient to operate at the boiling temperature of the reaction mixture, either under reflux or with distillation of solvent, if employed, or of the alkanoic acid produced in the reaction. Upon completion of the reaction the desired product may be separated in conventional fashion such as filtration or extraction with a suitable organic solvent.

The following examples illustrate the invention but are not to be construed as limiting:

*Example 1*

21.4 grams (0.108 mole) of picramic acid, 18 grams (0.14 mole) or propionic anhydride and 3 drops of concentrated sulfuric acid were mixed together and the resulting mixture heated on a steam bath. The heating was carried out with occasional shaking and over a period of 16 hours. Following the latter period, the mixture was brought to room temperature, whereupon a 2-ethyl-5,7-dinitrobenzoxazole product precipitated therein as a crystalline solid and was separated by filtration. When the latter product was recrystallized from ethanol it was found to melt at 134–135° C.

*Example 2*

200 grams of a wet picramic acid product and 400 milliliters of propionic acid were mixed together and the resulting mixture distilled at gradually increasing temperatures up to a column temperature of 140° C. During the latter operation a constant boiling mixture of propionic acid and water was distilled out of the mixture and collected. During the distillation, 80 grams of water was collected. The resulting mixture was then brought to room temperature and 330 grams (2.54 moles) of propionic anhydride and 3 grams of sulfuric acid added thereto with stirring. The latter mixture was thereafter heated at gradually increasing temperatures up to a pot temperature of from 145° to 150° C. This operation was carried out with the distillation of propionic acid and until a total of about 540 milliliters of acid was obtained. The reaction mixture was then cooled to room temperature, whereupon a 2-ethyl-5,7-dinitrobenzoxazole product precipitated therein as a crystalline solid, and was separated by filtration.

*Example 3*

40 grams (0.2 mole) of picramic acid, 143 grams (1.1 moles) of propionic anhydride and 0.9 gram of sulfuric acid were dispersed in 145 milliliters of xylol and the resulting mixture heated at a temperature of from 130° to 140° C. for 3 hours and under reflux. Following the latter period, the reaction mixture was cooled to room temperature. During the cooling, a 2-ethyl-5,7-dinitrobenzoxazole product precipitated in the mixture as a crystalline solid, and was separated by filtration.

*Example 4*

100 grams (0.5 mole) of picramic acid and 5 grams of benzenesulfonic acid were dispersed in 300 grams of propionic acid and the resulting mixture warmed to about the boiling point and thereafter cooled to about 60° C. 280 grams (2.15 moles) of propionic anhydride was added to the cooled mixture with stirring, and the resulting product thereafter heated at the boiling temperature for a period of time. The heating was carried out with the distillation of propionic acid and until 480 grams of propionic acid had been obtained. Following the latter operation, the reaction mixture was cooled to room temperature, a 2-ethyl-5,7-dinitrobenzoxazole product precipitating therein as a crystalline residue. The latter mixture was extracted with hot petroleum ether boiling at 86°–100° C. (Skelly solvent) and the solvent extract cooled to room temperature and filtered to separate the 2-ethyl-5,7-dinitrobenzoxazole product.

*Example 5*

One-half mole of picramic acid and 5 grams of a finely ground cation exchange resin in the acid form (styrenedivinylbenzene copolymer, sulfonated) were dispersed in 400 grams of propionic acid and the resulting mixture warmed to about the boiling point and thereafter cooled to about 60° C. 280 grams (2.15 moles) of propionic anhydride was then added to the cooled mixture and the resulting product heated at the boiling temperature for a period of time. This operation was carried out with the distillation of propionic acid and until 640 grams of propionic acid had been obtained. The reaction mixture was then cooled to room temperature, a 2-ethyl-5,7-dinitrobenzoxazole product precipitating therein as a crystalline solid. The latter mixture was extracted with hot Skelly solvent and the solvent extract cooled to room temperature and filtered to separate the desired product.

*Example 6*

21.4 grams (0.108 mole) of picramic acid, 95 grams (0.6 mole) of butyric anhydride and 3 drops of concentrated sulfuric acid were mixed together and the resulting mixture heated on a steam bath over a period of 16 hours. Following the latter period, the mixture was brought to room temperature, whereupon a 2-n-propyl-5,7-dinitrobenzoxazole product precipitated therein as a crystalline solid and was separated by filtration. When the latter product was recrystallized from acetone it was found to melt at 78°–80° C.

The products of the preceding examples have been tested for the control of *Salmonella typhosa* and *Micrococcus pyogenes*. In such operations, 100 percent kills have been obtained at concentrations of 1 part in 1000.

I claim:

1. A dinitrobenzoxazole of the formula

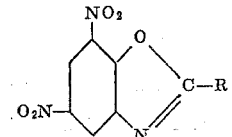

wherein R is an alkyl radical of the group consisting of ethyl and propyl.

2. 2-ethyl-5,7-dinitrobenzoxazole.
3. 2-propyl-5,7-dinitrobenzoxazole.

References Cited in the file of this patent

Pearl et al.: J. Am. Chem. Soc., vol. 60, pp. 925–6 (1938).